United States Patent
Meacham, II

(10) Patent No.: US 10,646,814 B2
(45) Date of Patent: May 12, 2020

(54) REPLACEABLE GREASE CONTAINMENT DEVICE, KIT AND ASSEMBLY FOR ROOFTOP OR WALL-MOUNTED EXHAUST FAN

(71) Applicant: Robert R. Meacham, II, Springfield, IL (US)

(72) Inventor: Robert R. Meacham, II, Springfield, IL (US)

(73) Assignee: R.D.J.C. LLC, Springfield, IL (US)

( * ) Notice: Subject to any disclaimer, the term of this patent is extended or adjusted under 35 U.S.C. 154(b) by 552 days.

(21) Appl. No.: 15/587,745

(22) Filed: May 5, 2017

(65) Prior Publication Data
US 2018/0318751 A1 Nov. 8, 2018

(51) Int. Cl.
| | | |
|---|---|---|
| *B01D 53/02* | (2006.01) | |
| *B01D 53/04* | (2006.01) | |
| *B01J 20/10* | (2006.01) | |
| *B01J 20/26* | (2006.01) | |
| *B01J 20/28* | (2006.01) | |
| *B01D 53/00* | (2006.01) | |
| *B01D 17/02* | (2006.01) | |

(52) U.S. Cl.
CPC ..... *B01D 53/0415* (2013.01); *B01D 17/0202* (2013.01); *B01D 53/002* (2013.01); *B01J 20/106* (2013.01); *B01J 20/262* (2013.01); *B01J 20/28016* (2013.01); *B01D 53/0407* (2013.01); *B01D 2253/106* (2013.01); *B01D 2257/70* (2013.01); *B01D 2257/90* (2013.01); *B01D 2258/0275* (2013.01)

(58) Field of Classification Search
CPC .......... B01D 17/0202; B01D 2253/106; B01D 2257/70; B01D 2257/90; B01D 53/002; B01D 53/0407; B01D 53/0415; B10D 2258/0275; B01J 20/106; B01J 20/262; B01J 20/28016
See application file for complete search history.

(56) References Cited

U.S. PATENT DOCUMENTS

| | | | |
|---|---|---|---|
| 4,323,373 A | 4/1982 | Fritz | |
| 4,635,617 A * | 1/1987 | Simonsen | ............... F24C 15/20 126/299 E |
| 4,869,236 A | 9/1989 | Blough | |
| 4,987,882 A | 1/1991 | Kaufman | |
| 5,205,279 A | 4/1993 | Brown | |
| 5,451,744 A * | 9/1995 | Koopman | ............. A47J 37/042 219/400 |
| 5,512,073 A | 4/1996 | Mirza et al. | |
| 5,567,216 A | 10/1996 | Mirza et al. | |

(Continued)

*Primary Examiner* — Christopher P Jones
(74) *Attorney, Agent, or Firm* — Armstrong Teasdale LLP

(57) ABSTRACT

A grease containment device for an exhaust fan is provided. The device includes an outer housing and an inner housing. The outer housing defines an interior receptacle, a first end surface, and a second end surface opposing the first end surface. The first end surface includes an inlet to the interior receptacle for grease from the exhaust fan, and the second end surface includes a sloped drainage surface leading to at least one drainage opening. The inner housing is located within the interior receptacle and includes a quantity of grease absorbent media in communication with the inlet. The grease absorbent media is hydrophobic, and the inner housing includes a porous portion proximate the sloped drainage surface.

20 Claims, 8 Drawing Sheets

(56) References Cited

U.S. PATENT DOCUMENTS

| | | |
|---|---|---|
| 5,632,889 A | 5/1997 | Tharp |
| 5,809,993 A | 9/1998 | Neitzel et al. |
| 5,814,115 A | 9/1998 | Allen et al. |
| 6,010,558 A * | 1/2000 | Ackland ............... B01D 46/30 55/515 |
| 6,391,074 B1 | 5/2002 | McCrary |
| 6,468,323 B1 | 10/2002 | Chwala |
| 6,648,937 B1 | 11/2003 | Nguyen et al. |
| 6,676,723 B2 | 1/2004 | Chwala |
| 7,244,283 B2 | 7/2007 | Mirza |
| 7,332,004 B2 | 2/2008 | Jackson |
| 7,484,506 B2 * | 2/2009 | Besal ................... F24C 15/20 126/299 E |
| 8,343,353 B1 | 1/2013 | Dunn et al. |
| 8,496,840 B1 | 7/2013 | Dunn et al. |
| 8,574,443 B1 | 11/2013 | Mims et al. |
| 2006/0042621 A1 * | 3/2006 | Besal ................... F24C 15/20 126/299 D |
| 2007/0101986 A1 | 5/2007 | Gilchrist |
| 2007/0135031 A1 | 6/2007 | Vlamis |
| 2009/0013989 A1 | 1/2009 | Brown |
| 2009/0114094 A1 | 5/2009 | Clapp, III et al. |
| 2010/0199618 A1 | 8/2010 | Tomkiewicz |
| 2011/0151548 A1 | 6/2011 | Clapp, III et al. |

* cited by examiner

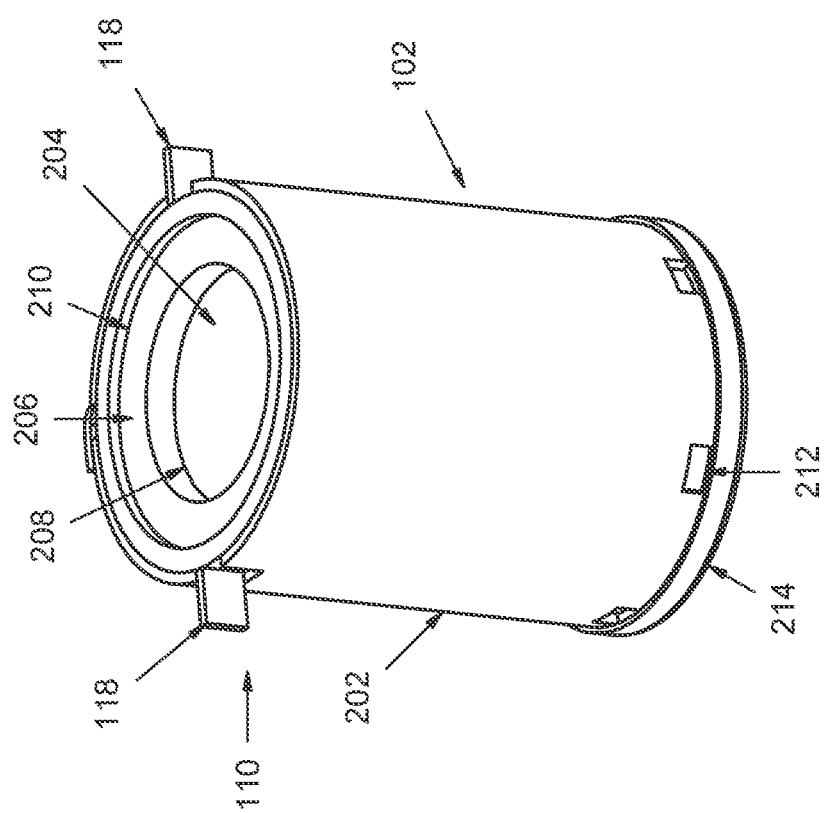

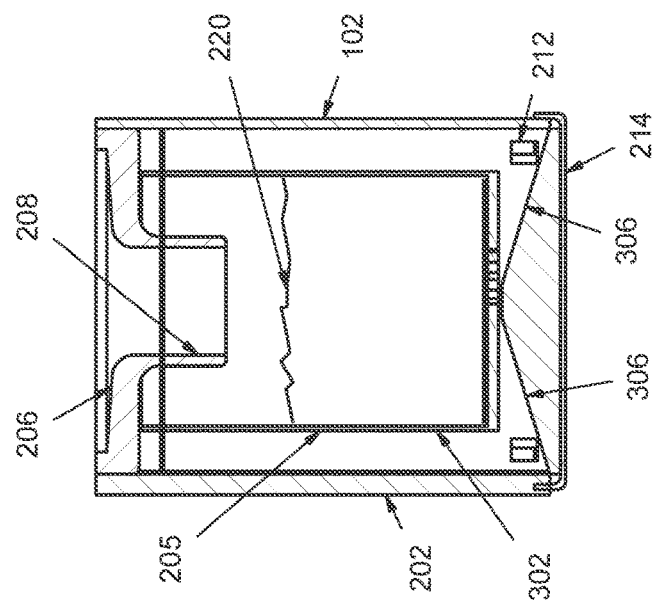
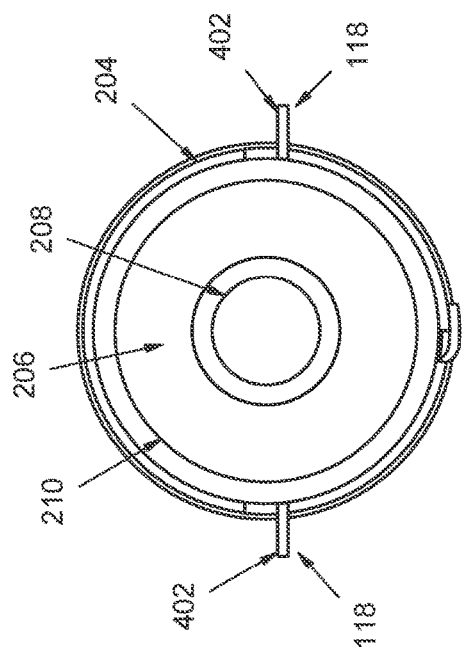
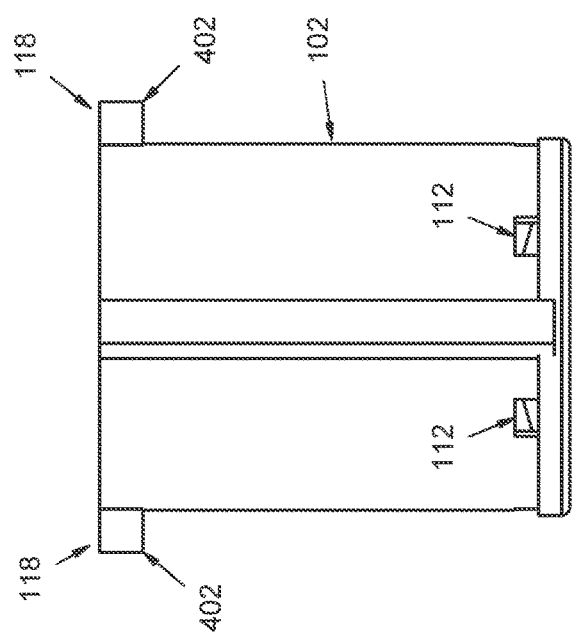

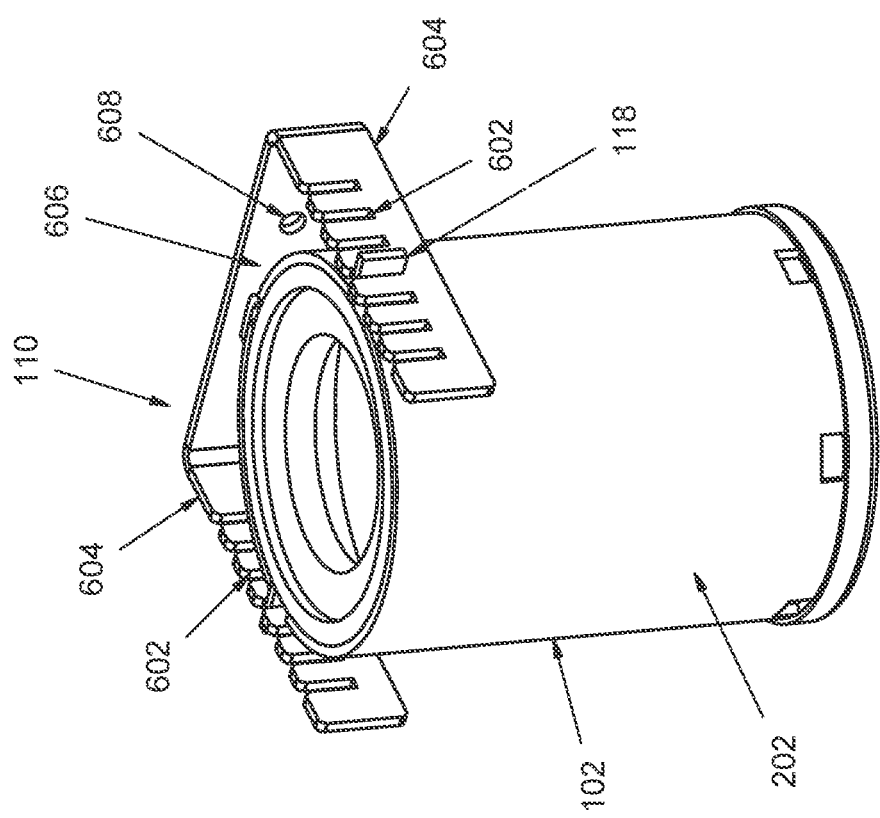

ent surface includes an inlet to the interior receptacle for grease from the exhaust fan, and the second end surface includes a crowned drainage surface including an apex and sloped surfaces leading to respective drainage openings in the outer housing. The inner housing is located within the interior receptacle and includes a quantity of grease absorbent media in communication with the inlet. The grease absorbent media is hydrophobic, and the inner housing includes a porous portion proximate the sloped drainage surface.

REPLACEABLE GREASE CONTAINMENT DEVICE, KIT AND ASSEMBLY FOR ROOFTOP OR WALL-MOUNTED EXHAUST FAN

BACKGROUND OF THE INVENTION

The field of the invention relates generally to devices for collecting and retaining grease, and more specifically to devices for collecting grease from an exhaust fan for a cooking facility.

Commercial food preparation facilities, including but not necessarily limited to restaurant facilities, are equipped with exhaust fans to remove airborne grease, combustion products, fumes, smoke, odors, heat, and steam from the air inside the facility as food is being cooked. Exhaust fans typically draw air including cooking by-products through an exhaust hood or extractor hood above a cooking appliance or cooking appliances in the kitchen, into ductwork and discharged to the atmosphere at a rooftop location or at an exterior wall location. Vaporized grease in the exhausted air tends to condense in the exhaust fan, however, and if not contained the grease presents a number of problems and concerns to cooking facility operators. Containment devices are known that serve to collect and contain grease in an exhaust fan, but known containment devices remain disadvantaged in some aspects. Improvements are accordingly desired.

BRIEF DESCRIPTION OF THE INVENTION

In one aspect, a grease containment device for an exhaust fan is provided. The device includes an outer housing and an inner housing. The outer housing defines an interior receptacle, a first end surface, and a second end surface opposing the first end surface. The first end surface includes an inlet to the interior receptacle for grease from the exhaust fan, and the second end surface includes a sloped drainage surface leading to at least one drainage opening. The inner housing is located within the interior receptacle and includes a quantity of grease absorbent media in communication with the inlet. The grease absorbent media is hydrophobic, and the inner housing includes a porous portion proximate the sloped drainage surface.

In another aspect, a grease containment kit for an exhaust fan, including at least one replaceable grease containment device is provided. The device includes an outer housing and an inner housing. The outer housing defines an interior receptacle, a first end surface, and a second end surface opposing the first end surface. The first end surface includes an inlet to the interior receptacle for grease from the exhaust fan, and the second end surface includes a sloped drainage surface leading to at least one drainage opening. The inner housing is located within the interior receptacle and includes a quantity of grease absorbent media in communication with the inlet. The grease absorbent media is hydrophobic, and the inner housing includes a porous portion proximate the sloped drainage surface.

In yet another embodiment, a grease containment assembly for a rooftop or wall-mounted exhaust fan including a replaceable grease containment device is provided. The device includes an outer housing, an inner housing, and a universal mounting bracket holding the outer housing in a selected one of a plurality of locations relative to the roof-mounted or wall-mounted exhaust fan. The outer housing defines an interior receptacle, a first end surface, and a second end surface opposing the first end surface. The first

BRIEF DESCRIPTION OF THE DRAWINGS

Non-limiting and non-exhaustive embodiments are described with reference to the following Figures, wherein like reference numerals refer to like parts throughout the various drawings unless otherwise specified.

FIG. 2 is a perspective view of the exemplary replaceable grease containment device shown in FIG. 1.

FIG. 3 is a cross-sectional view of the grease containment device shown in FIG. 2.

FIG. 4 is top view of the grease containment device shown in FIG. 2.

FIG. 5 is a side elevational view of the grease containment device shown in FIG. 2.

FIG. 6 is a perspective view of the replaceable grease containment device shown in FIG. 2 and an exemplary universal mounting bracket for the rooftop exhaust fan assembly shown in FIG. 1.

DETAILED DESCRIPTION OF THE INVENTION

Figure 1:
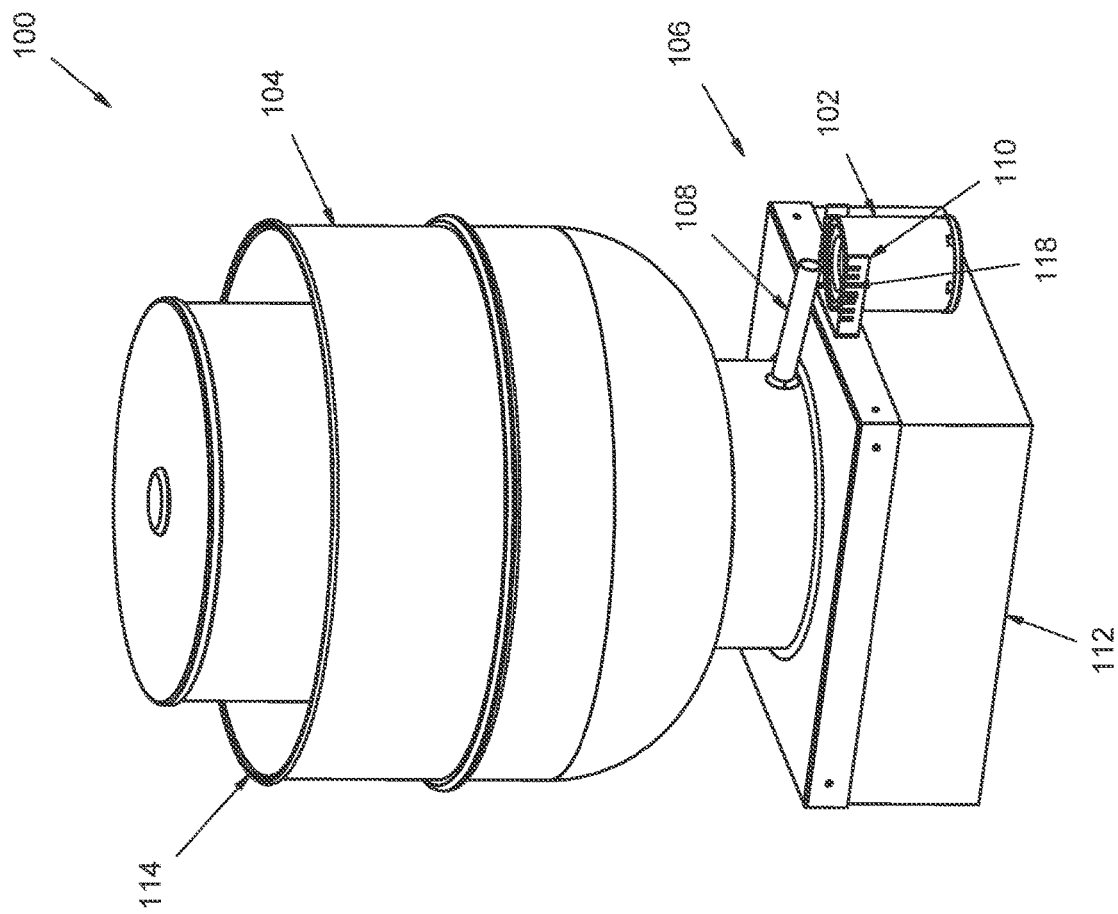
FIG. 1 is a perspective view of an exemplary embodiment of a rooftop exhaust fan assembly including a replaceable grease containment device of the present invention.

As mentioned above, devices exist that serve to collect and contain condensed grease in an exhaust fan of a cooking facility. If not contained, the grease may coat the rooftop or wall where the exhaust fan is mounted. Grease-coated roofs and walls are not only unsightly, but can cause unpleasant odors, prematurely degrade or corrode the roof or wall surface, present regulatory compliance issues, and present safety issues.

In the case of a roof-mounted exhaust fan, a greasy roof near the exhaust fan presents an increased hazard to navigate on the rooftop. Access to the roof may be needed for a variety of reasons, including but not necessarily limited to cleaning or servicing of the exhaust fan, servicing HVAC equipment or other equipment on the rooftop, or maintaining or servicing the roof itself. A greasy roof near the exhaust fan presents an increased hazard to navigate on the rooftop, especially when a person for whatever reason may not realize that the roof is greasy. Especially for steeply sloped roofs and/or metal roofs that can already be difficult to navigate, grease on the roof may substantially increase a difficulty of performing needed tasks on the roof and/or increase safety risks of completing tasks on the roof. Even if the roof is safely navigated, a grease-coated roof presents additional risks and difficulties in safely using ladders and tools needed for rooftop tasks. Grease-coated walls near a wall-mounted exhaust fan may raise similar issues concerning safe use of ladders and tools to perform necessary tasks near the fan.

Whether on the roof or a wall, greasy deposits from an exhaust fan can also be a fire hazard and must be removed to meet regulatory and insurance requirements. For cooking facilities that are regularly inspected, grease deposits on the roof or wall may be a noted deficiency in an inspection, and action may be required to clean the roof or wall as a condition of a continued license to operate the cooking facility. Of course, cleaning of the roof or wall may take some time to satisfactorily accomplish and presents expense to the owner of the cooking facility. If the roof or wall is damaged by grease, expensive repairs and business disruptions may result.

A potential solution to the problems above may be to incorporate improved grease containment features and filtering features in the design of exhaust fan systems themselves. That is, the exhaust fan design may include built-in grease containment features. For many cooking facility operators, however, replacing or upgrading their exhaust fans to include improved grease containment capability is neither practical nor desirable. Cooking facility operators would much prefer a simpler and lower cost option to solve grease containment issues with their existing fans. As such, it would be desirable to provide a grease containment device that can be easily retrofit to existing exhaust fans.

Replaceable or refillable grease containment devices are known that may be assembled to an existing exhaust fan in the field, and are designed to contain viscous grease that condenses in a cooking facility exhaust. Such devices typically include a filter media to trap or retain the condensed grease, and such devices may be periodically replaced or refilled as the media can only retain a certain amount of grease before becoming ineffective. Known devices of this kind have certain limitations, however, that render them unreliable in certain conditions and problematic or inconvenient in certain aspects. Existing exhaust fan grease containment device of this type accordingly have yet to fully meet long felt and unresolved needs of the marketplace in important aspects and improvements are desired.

For example, in dry weather conditions certain types of replaceable or refillable grease containment devices can work quite well, but in wet weather conditions they may be compromised. When it rains, the grease containment device tends to fill with rainwater, and a mix of rainwater and grease may become trapped in the filter device. If exposed to sufficient amounts of rain, the greasy water mixture in the device may overflow the device, and a greasy coating on the roof or wall may nonetheless result despite the presence of the grease containment device. When this happens the area of the greasy deposits on the roof may be considerably larger than it might be if the grease containment device was not there at all. Also, any attempt to service such a grease containment device, either by replacing it or refilling it with new media for continued use, may result in spillage of the greasy water inside the device onto the roof or wall. Especially when the servicer does not realize that water is present in the device, or when the device is completely full of water, spillage may be likely. In some cases, the media may be provided in pouches or pillows that may be removed and replaced with the remainder of the grease containment is in place, but if soaked in rainwater some dripping and spillage will inevitably occur when removing and replacing the media.

Another limitation of known grease containment devices is that grease can sometimes exit the exhaust fan in a location where the grease containment devices is not able to receive it. Especially for a wall-mounted exhaust fan, the grease containment device is typically located at a point where grease is expected to drip from the fan, but grease may sometimes drip from the fan at a location other than where one might expect. Again, a greasy coating on the roof or wall may result despite the presence of the grease containment device. On a related point, given the variety of different types of exhaust fans in use, it can be difficult to install known grease containment devices to certain types of fans to reliably collect grease and contaminants from the fan in the first place. Customized grease containment devices and accessories are possible that may more effectively ensure optimal location and alignment of the containment device with respect to the fan, but in general customized grease containment devices and/or customized accessories to mount them are impractical and expensive to apply over a large customer base of cooking facilities.

Servicing of existing grease containment devices presents still other challenges in some aspects. In some cases, and especially for containment devices that are unfamiliar to the servicer, it may not be immediately apparent to the servicer exactly how to access the device for refill or replacement. Extended service time may result at an increased cost. When tools are required and tool access is limited to complete the service, the servicing procedure may simply be difficult and frustrating to complete, and again service time may be extended at an increased cost. A simpler device that may be more efficiently and easily serviced in an easy and intuitive manner is desired.

Finally, known grease containment devices can themselves present fire hazards even if they properly function to contain grease and prevent grease deposits on a roof or wall. Specifically, if a fire occurs in the kitchen, burning particulates may be exhausted from the fan and ductwork into the grease containment device. Collected grease in the filter device may be ignited and a second fire may commence at the roof or wall where the grease containment device is located. Accordingly, even if a fire in the kitchen may be quickly contained, a fire on the rooftop or wall may not. Especially in a rooftop application, a fire in the containment device may not immediately be noticed.

Exemplary embodiments of an exhaust fan grease containment device, kit and assemblies of the invention are described below that overcome the problems described above. The devices, kits and assemblies may be provided at relatively low cost for retrofit application to existing exhaust fans of cooking facilities, with improved performance and reliability and while simplifying servicing procedures.

Grease, but not water, may be reliably contained in a replaceable grease containment device of the invention such that the operation of the device is unaffected by wet weather conditions. More specifically, grease is trapped and retained in a media inside the device of the invention, while rainwater may flow through the device and exit or drain from the device without being contaminated by grease. Even in very wet and stormy weather, the device of the invention will reliably prevent greasy deposits on the roof or wall near an exhaust fan. Because water is effectively drained from the device in use, spillage of water is not an issue when replacing it.

The replaceable grease containment device of the invention may further be utilized with a variety of different exhaust fans with convenient universal mounting brackets that provide adjustability of the grease containment device location relative to the bracket and also the exhaust fan in a simple and intuitive manner to meet the particular needs of different installations and types of fans. With the universal mounting brackets, the grease containment device may be easily mounted for use in roof-mounted exhaust fans and wall-mounted exhaust fans. Optimal location and alignment of the grease containment device is possible across a variety of different exhaust fans in different locations.

The replaceable grease containment device of the invention may likewise be attached to the universal mounting brackets easily and intuitively, as well as easily and intuitively removed for replacement with another grease containment device. The grease containment device may include integrated hanging structure that does not require tools to hang the device on the universal mounting bracket, simplifying service procedure and reducing service time to replace the grease containment device when needed.

The grease containment device of the invention may also include fire stop features for improved safety of the device if burning particulates are introduced into the device by the exhaust fan. In one aspect, a fireproof or flame retardant media is included in the device to retain the grease. In another aspect, the grease containment device may include insulation and/or flame retardant materials surrounding the media included in the device. In another aspect, a heat release fire suppression feature may be included to dispense additional flame retardant media into the device in case of fire. As such, combustion of grease in the containment device either will not occur or will be quickly extinguished by the fire stop features provided.

While described in the context of exhaust fans for commercial cooking facilities, the replaceable grease containment device, kits and assemblies are not necessarily limited to such applications. The description in this aspect is provided for the sake of illustration rather than limitation. Method aspects of the invention will in part be explicitly discussed and in part apparent from the description below.

An exhaust fan grease containment assembly is disclosed herein. The assembly includes a grease containment device removably coupled to an exhaust fan by way of a universal mount bracket for collecting and storing grease (e.g. condensed grease). Exhaust fans include, but are limited to, rooftop exhaust fans for a food preparation facility (e.g. a restaurant). The universal mounting bracket is sized appropriately to enable coupling of the device to a variety of different exhaust fans.

The device includes an outer housing defining an interior receptacle and an inner housing located in the interior receptacle. The device receives or catches the condensed grease on a surface including an inlet located on the outer housing. The condensed grease passes through the inlet into the interior receptacle, minimizing and/or preventing the spilling of grease outside the device.

The inner housing includes a quantity of grease absorbent media for absorbing the condensed grease. In the example embodiment, the grease absorbent media is a particulate material, and includes expanded perlite particles treated with a silicone. The grease absorbent media is also fireproof, reducing or preventing grease fires within the device. The grease absorbent media may include, but is not limited to, a dry, hydrophobic chemical grease absorbent such as commercially available XSORB material that may include absorbent expanded perlite particles treated with a silicone.

The outer housing further includes at least one drainage opening to prevent the device from filling up with water, such as from rainfall. In the example embodiment, as rainfall enters the device, it travels through a porous portion located in the inner housing proximate to a sloped drainage surface located in the inner housing. The water leaves the inner housing through the porous portion, travels down the drainage surface towards the at least one drainage opening, and through the at least one drainage opening, effectively exiting the device. The pores within the porous portion are sized appropriately to allow the passage of water, but prevent the passage of grease absorbent media.

In some embodiments, the device includes a fire suppression feature included within the device to extinguish a grease fire in the device caused by the introduction of burning particulates into the device. In one embodiment, the fire suppression feature includes a heat releasable package located above the interior receptacle that is filled with a flame retardant medium. The package may be made of a propylene material that is meltable by fire to release additional flame retardant media to extinguish the fire. The medium may be, but is not limited to, commercially available XSORB material as described above. The storing member melts when introduced to a fire within the interior receptacle, and the fire retardant medium is released onto the fire. This mechanism will not only prevent some grease fires, but Such a fire suppression feature will slow the progress of a fire, and if not eliminate any need to attend to thee device, allow first responders additional time to do so.

FIG. 1 is a perspective view of an exemplary embodiment of a rooftop exhaust fan assembly 100 including a replaceable grease containment device 102 of the present invention. Device 102 is mountable in a location 106 suitable for collecting condensed grease from exhausted air via exhaust fan 104 for a commercial cooking facility. In the example embodiment, as illustrated in FIG. 1, device 102 is located below a drip spout 108 coupled to exhaust fan 104, wherein drip spout 108 is configured to drain accumulated grease and other accumulated liquids away from exhaust fan 104. Device 102 is further configured to couple to exhaust fan 104 by way of a universal mounting bracket (bracket) 110 by hand and without tools.

Universal mounting bracket 110, as well as device 102, are each fabricated from a material suitable for outdoor use, including but not necessarily limited to metal materials. It should be known that both device 102 and bracket 110 are configured to couple to exhaust fans of different types. Bracket 110 fastens to exhaust fan 104 by way of any suitable fastening method. In the example embodiment, bracket 110 accommodates screws and/or bolts to fasten to exhaust fan 104.

Device 102 includes an integrated hanging structure 118 located on opposite sides of device 102. To couple device 102 to bracket 110, device 102 is placed over bracket 110 and integrated hanging structure 118 is received at least partly in the bracket 110, wherein the device 102 hangs from bracket 110 in the desired location relative to the fan 104.

As exhaust air is expelled from a duct 112 via the exhaust fan 104, condensed grease accumulates within exhaust fan 104, and is discharged through drip spout 108. Device 102, coupled to exhaust fan 104 via bracket 110, receives the grease from drip spout 108. Device 102 further absorbs/stores the grease as to prevent the grease from spilling out of device 102.

In the example embodiment, device 102 is replaceable. For example, when the absorbent medium within device 102 has reached a saturation point and absorbed a maximum amount of grease, a user or servicer may manually remove device 102 from bracket 110, and further insert a new device 102 into bracket 110. In another embodiment, however, the device 102 may be refillable instead of replaceable. That is, after the medium within device 102 has absorbed a maximum amount of grease, a user or servicer may remove device 102 from bracket 110, dispose of the medium within device 102, insert new medium into device 102, and insert device 102 back onto bracket 110.

FIG. 2 is a perspective view of the exemplary replaceable grease containment device shown in FIG. 1. Device 102 further includes an outer housing 202 and an interior receptacle 204. Outer housing 202 is configured to protect against damage from, for example, weather and other outside elements. Outer housing 202 is made of a material that is at least one of, but not limited to, a metal and/or a plastic. The interior receptacle 204 is configured to collect the grease from exhaust fan 104, and store the grease absorbent medium for absorbing the grease to prevent spilling of grease from exhaust fan 104 and/or from the device 102. Receptacle 204 is sized to fit within outer housing 102. It should be known that outer housing 202 and receptacle 204 are not limited to a particular size or shape. For example, different sized exhaust fans 104 may require larger devices 102 having a larger volume of receptacle 204 and grease absorbent media. While a round or cylindrical-shaped device 102 is shown, non-round or polygonal shapes are likewise possible in further and/or alternative embodiments. Moreover, bracket 110 may be sized and dimensioned to fit any type of exhaust fan 104 to accommodate any size of device 102.

Device 102 further includes a first end surface 210 configured to receive grease from drip spout 108. First end surface 210 includes a draining surface 206 and an inlet 208 for directing grease particle flow from first end surface 210 into receptacle 204. Draining surface 206 is sloped as to allow a downward flow of grease that fall on top of first end surface 210. Inlet 208 is an opening on first end surface 210 that allows for the passage of grease from draining surface 206 to receptacle 204. In the example embodiment, as illustrated in FIG. 2, draining surface 206 is depressed relative to outer housing 202, as to prevent overflow and spilling of grease of the sides of device 102.

Device 102 further includes a second end surface 214 located opposite to first end surface 210 and coupled to outer housing 202. Second end surface 214 is configured to hold and support receptacle 204. In an embodiment, at least one of first end surface 210 and/or second end surface 214 are configured to be separate from outer housing 202 and may be removable. In other embodiments, at least one of first end surface 210 and/or second end surface 214 are integrated as a single unit with housing 202.

Outer housing 202 further includes at least one drainage opening 212 in the side wall of the outer housing 202 located near second end surface 214. Each at least one drainage opening 212 is configured to allow for passage of water from receptacle 204 to the outside of device 102. In the example embodiment, as illustrated in FIG. 2, device 102 includes a plurality of drainage openings 212 space apart from one another on the circumference of the side wall of the outer housing 202 and may include, for example only, four openings spaced about 90° apart from one another proximate the end surface 214. For example, this allows for the removal of water from device 102 collected from rain or other outside sources at multiple different locations in the device 102. In further and/or alternative embodiments, drainage openings may likewise extend through the end surface 214 in addition to or in lieu of the draining openings 212.

FIG. 3 is a cross-sectional view 300 of the grease containment device 102 shown in FIG. 2. Receptacle 204 is defined in an inner housing 205 sized to fit within outer housing 202. Outer housing 202 is configured to protect receptacle 204 and the grease from outside elements such as wind. A space between outer housing 202 and receptacle 204 may be filled with insulation and/or a flame retardant material to further ensure the containment of a possible grease fire started within device 102.

In the example embodiment, inner housing 205 includes grease absorbent media 220 in the receptacle 204, such as a quantity of commercially available XSORB material, in communication with inlet 208. More specifically, the media 220 may include expanded perlite particles treated with a silicone. Such media 220 may be particularly effective for grease absorption, although other suitable materials may alternatively be utilized as desired. That is, in other embodiments, grease absorbent media 220 may generally include any material suitable for the absorption of condensed grease. The grease absorbent media 220 is also preferably hydrophobic, such as but not limited to, hydrophobic silica particles, ensuring that water from rainfall does not mix with the grease within device 102 and potentially spill from the device 102.

As described above, outer housing 202 includes a plurality of drainage openings 212 for the removal of water from device 102. The inner housing 205 defining the receptacle 204 further is porous, or includes a porous portion allowing passage of water from the receptacle 204 to the outer housing 202 proximate drainage openings 212. Second end surface 214 includes a sloped drainage surface 306 that facilitates the movement of water from receptacle 204 through drainage openings 212 and outside device 102. In cross section, the drainage surface 306 is a crowned surface having a centrally located apex and sloped sides extending downwardly from the apex as shown in FIG. 3 toward the drainage openings 212. As described above, as rainfall enters the device, it travels through the receptacle 204 and the inner housing 205 to the sloped drainage surface 306 located in the inner housing 302, and through at least one of the drainage openings 212, effectively exiting device 102. As such, the device 102 collects grease, but not water.

FIG. 4 is top view of the grease containment device shown in FIG. 2. First end surface 210, in combination with first draining surface 206, is sized to receive grease from exhaust fan 104 and direct the grease flow towards inlet 208. Hanging structure 118 includes on the outer housing 102 a generally flat and rectangular projection 402, sometimes referred to as hanging tabs, suitable for insertion into bracket 110 as described further below. In the example embodiment, a pair of projections 402 project from outer housing 202 at locations about 180° apart from one another on the round outer housing 202 and extend outwardly in opposite directions to one another.

FIG. 5 is a side elevational view of the grease containment device 102 further showing the having tabs 402 at the upper end of the device 102 and the drainage openings at the lower end of the device 102. In the illustrated embodiments, the upper edges of the hanging tabs 418 are flush or coplanar with the top surface of the device 102, although they may alternatively be spaced from the top surface in another embodiment as desired.

FIG. 6 is a perspective view of the grease containment device 102 shown in FIG. 2 and an exemplary universal mounting bracket 110 for the rooftop exhaust fan assembly 100 shown in FIG. 1. As described above, integrated hanging structure 118 includes projections 402 in the form of hanging tabs projecting from outer housing 102. The universal mounting bracket 110 includes number of spaced apart apertures or openings 602 sized and configured for the insertion of at least one of the projections 402 in the device 102. In the illustrated example, each opening 602 is an elongated slot dimensioned to receive an edge of the rectangular projections 402, with the hanging tabs 402 receivable in any opposing ones of the pairs of slots 602 in the mounting bracket 110 This allows for the manual hanging of device 102 on bracket 110 in adjustable relative locations on the bracket 110 (and also with respect to the fan) without the need for tools. Other shapes of projections and openings are contemplated, however, and may be utilized in alternative embodiments as desired in order to hang the device 102 in the desired location. That is, projections other than hanging tabs may be included in the device 102 and openings other than slots may be included in the bracket 110. It is likewise contemplated that in another embodiment, the device 102 could include openings or apertures while the bracket 110 includes projections that may likewise be utilized to realize substantially the same effect of adjustable positioning of the device 102 with respect the fan 104.

Through the inclusion of multiple receiving slots 602, the universal mounting bracket 110 is sized to accept and hang device 102 in a one of a plurality of gradually different locations relative to bracket 110. For example, device 102 in combination with bracket 110 is suitable for multiple sizes of exhaust fans 104 and multiple sizes of drip spouts 108. A user or servicer may simply select and use the appropriate slot(s) 602 when hanging device 102 on bracket 110 to obtain the best hanging position for any particular fan and drip spout configuration. In the example embodiment, as shown in FIG. 6, the bracket 110 includes a pair of parallel arms 604 having a series of spaced apart slots 602, with respective pairs of slots in the arms defining one of the plurality of locations to hang the device 102.

In the example embodiment, bracket 110 further includes a back mounting piece 606 configured fasten bracket 110 to exhaust fan 104. In this embodiment, as illustrated in FIG. 6, mounting piece 606 has at least one hole 608 for the fastening of bracket 110 to exhaust fan 104 through the use of any suitable fastening method. The mounting piece 606 may be mounted to a vertically surface, such as the duct 112 shown in FIG. 1.

In the illustrated embodiment, bracket 110 is U-shaped and is relatively simply fabricated to include the mounting piece 606 and the pair of parallel arms 604 extending perpendicular to the mounting piece 606 and having the series of spaced apart slots 602 respectively defining one of the plurality of locations to hang the outer housing 202, or device 102. In this configuration, the mounting piece 606 may be considered a base section in the U-shaped bracket with the arms 604 being the legs of the U-shaped bracket. Other shapes and configurations of brackets are possible, however, including but not limited to the L-shaped bracket shown and described in relation to FIGS. 8 and 9.

Figure 7:
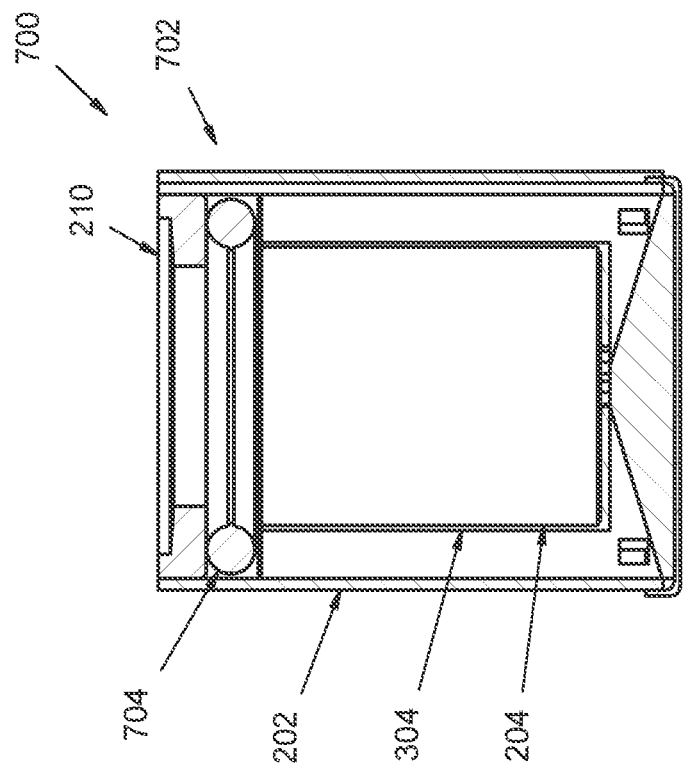
FIG. 7 is a cross-sectional view of another embodiment of a grease containment device including a fire suppression feature.

FIG. 7 is a cross-sectional view 700 of another embodiment of a grease containment device 102 similar to that described above but including a fire suppression element 702. Fire suppression element 702 reduces or suppresses a fire within device 102 by via reactive heat release of fire retardant material on top of a fire that starts within device 102. In one embodiment, fire suppression element 702 is located above receptacle 204 and inner housing 304, proximate first end surface 210. Fire suppression element 702 includes a heat releasable package 704 filled with a quantity of flame retardant media. In the illustrated embodiment, package 704 is formed in a donut shaped formation extending around the circumference of an upper rim of the receptacle 204.

In some embodiments, package 704 is made of a polypropylene material that melts when contacted with flame particles within device 102. For example, if a grease fire starts within the receptacle 204 of the device 102, the heat of the fire will melt the package 704, causing the package to structurally fail and release the flame retardant media stored within the package 704. The released media from the package 704 will fall on-top of the fire in the receptacle 204 within device 102, either reducing, stalling, or extinguishing the fire.

In some embodiments, more than one fire suppression element 702 may be utilized as desired. For instances, a plurality of heat releasable packages 704 may be provided at different locations to release additional amounts of media for fire suppression purposes.

The package 704 may be made of a propylene material in one example. The fire suppression medium in the package 704 may be, but is not limited to, a similar XSORB grease absorbent product as described above. The material of the package 704 has a melting temperature that may be reached by heat of a fire within the interior receptacle, and the fire retardant medium is then released onto the fire. the heat releasable package will, if not extinguish any fire present, will allow additional time for first responders to respond.

Figure 8:
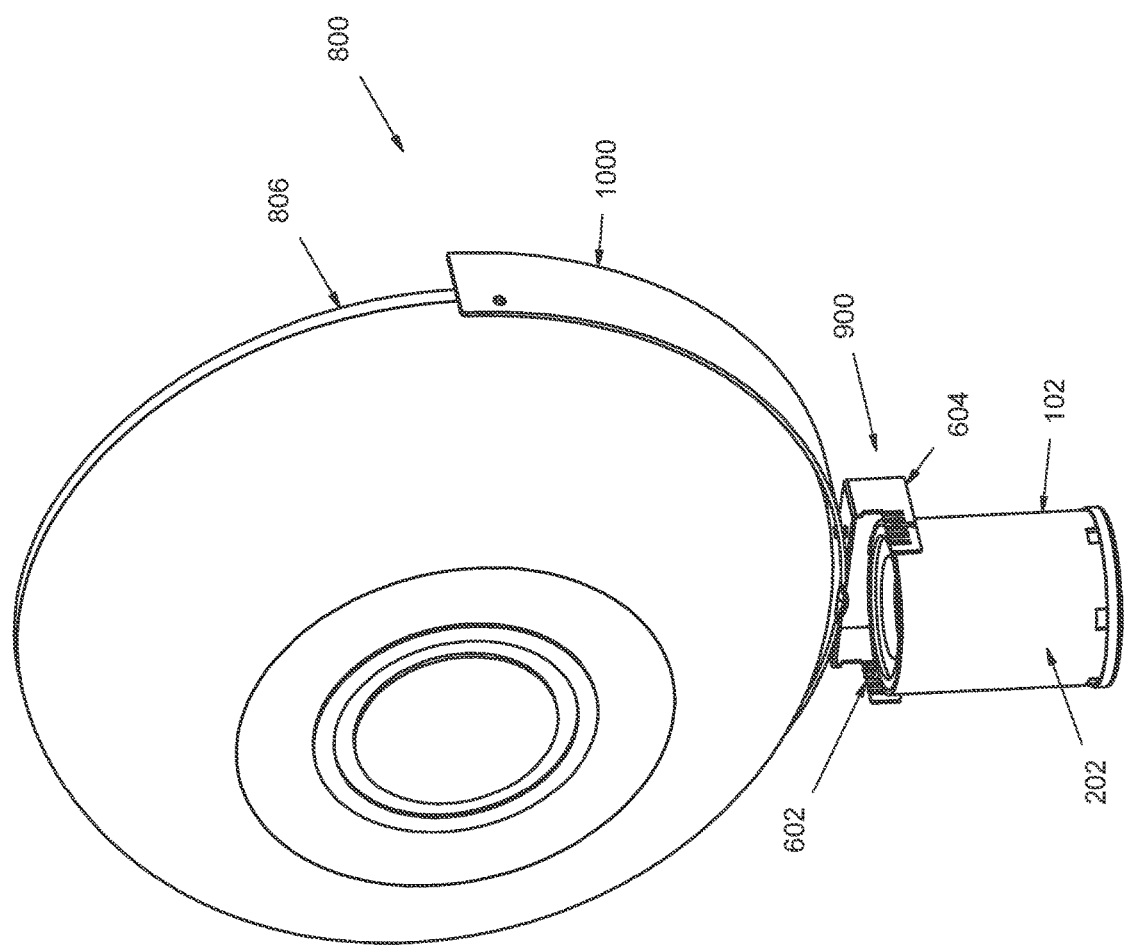
FIG. 8 is a perspective view of an exemplary embodiment of a wall mounted exhaust fan assembly including a grease containment device of the present invention.
Figure 9:
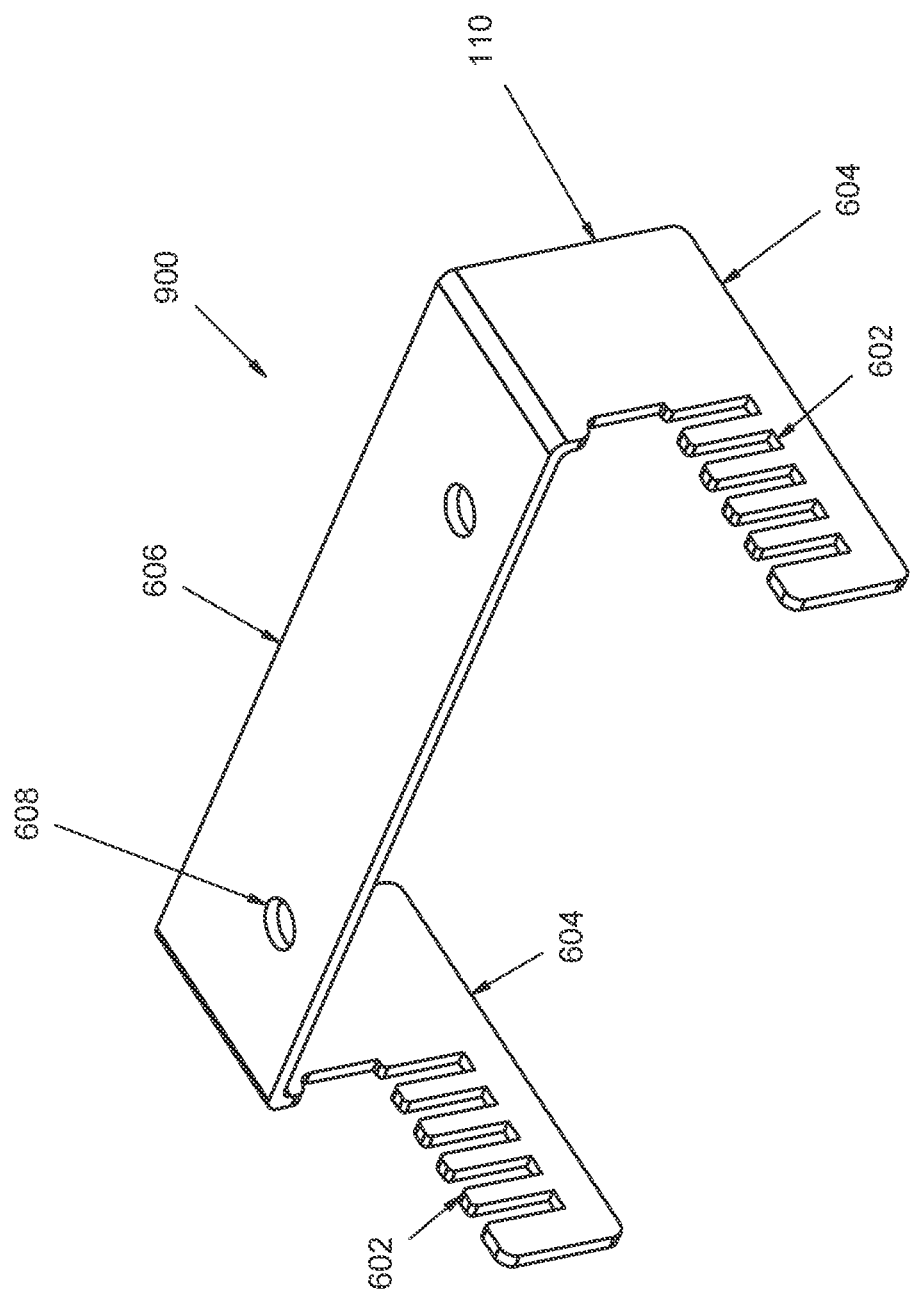
FIG. 9 is perspective view of an exemplary universal mounting bracket for the assembly shown in FIG. 8.

FIG. 8 is a perspective view of an exemplary embodiment of a wall mounted exhaust fan assembly 800 including grease containment device 102 of the present disclosure. In this embodiment, device 102 is configured to be used in combination with a wall hanging exhaust fan 806 and accordingly includes another universal mounting bracket 900 and a grease containment shield 1000 as described next.

FIG. 8 is perspective view of the universal mounting bracket 900 for the assembly 800 shown in FIG. 8. In this embodiment, and unlike the U-shaped bracket 110 described above, the bracket 900 includes a pair of L-shaped arms 604 extending parallel to one another, each having a series of spaced apart slots 602 respectively defining one of the plurality of locations to hang the outer housing 202, or device 102. Bracket 110 further includes the mounting piece 606 extending between the L-shaped arms 604 and including at least one hole 608 to enable fastening of device 102 to exhaust fan 806 such that the mounting piece 606 extends horizontally with the arms 604 extending vertically. The mounting piece 606 extends in a plane that is substantially perpendicular to the plane of the parallel legs arms 604. As a result, the shaped of the bracket 900 is a bit more complicated than the shape of the bracket 110 described above, but is still relatively easily manufactured.

Figure 10:
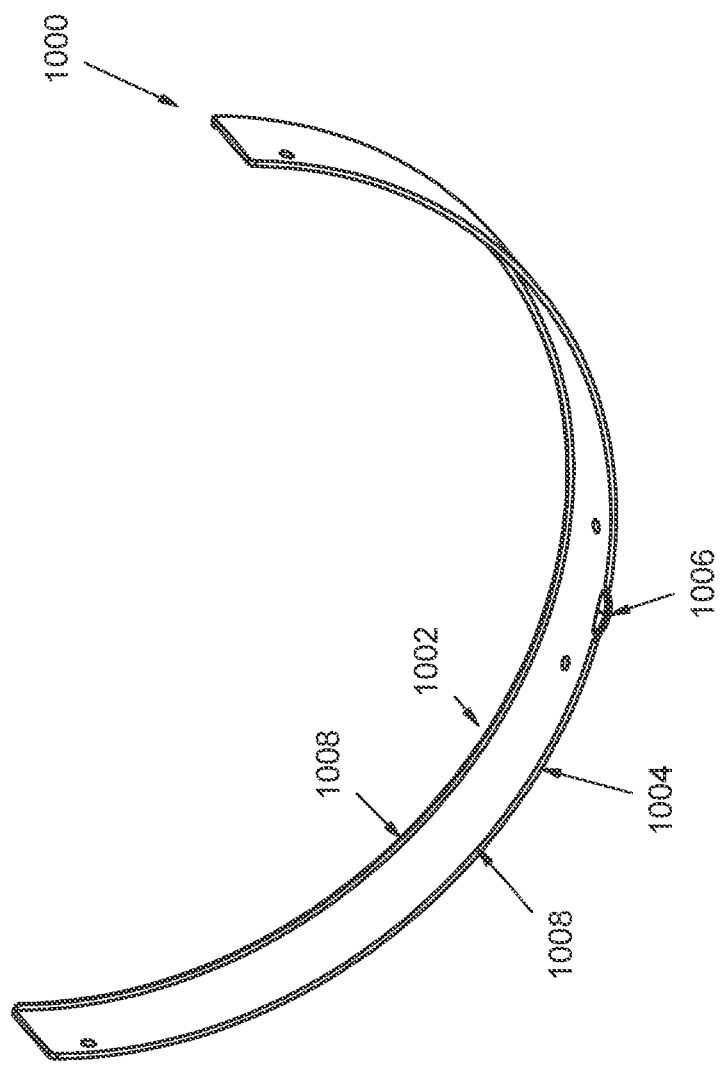
FIG. 10 is a perspective view of an exemplary grease containment shield for the assembly shown in FIG. 8.

FIG. 10 is a perspective view of an exemplary grease containment shield 1000 for assembly 800 shown in FIG. 8. Grease containment shield 1000 enhances grease collection from hanging exhaust fan 806. Grease accumulation drips from hanging exhaust fan 806 at various different locations and falls onto containment shield 1000. The accumulated grease then flows downward along containment shield 1000 towards device 102. Grease containment shield is configured to hang between hanging exhaust fan 806 and device 102.

Grease containment shield 1000 includes a first edge 1002 and a second edge 1004 opposing first edge 1002. First edge 1002 includes a grease containment lip 1008. Containment lip 1008 prevents the spilling of grease off the sides of grease containment shield 1004 as the grease flows downward.

Second edge 1004 includes a grease drip spout 1006 above inlet 208 of device 102. Grease drip spout 1006 is configured to direct and allow the grease flow from grease containment shield 1000 and into device 102.

The benefits and advantages of the invention are now believed to have been amply illustrated by the exemplary embodiments disclosed.

An embodiment for a grease containment device for an exhaust fan has been disclosed. The device includes: an outer housing defining an interior receptacle, a first end surface, and a second end surface opposing the first end surface, wherein the first end surface includes an inlet to the interior receptacle for grease from the exhaust fan, and wherein the second end surface includes a sloped drainage surface leading to at least one drainage opening; and an inner housing in the interior receptacle, the inner housing including a quantity of grease absorbent media in communication with the inlet, wherein the grease absorbent media is hydrophobic, and the wherein the inner housing includes a porous portion proximate the sloped drainage surface.

Optionally, the device may include a fire retardant material surrounding the inner housing in the interior receptacle. The grease absorbent media may be a particulate material, and further may be expanded perlite particles treated with a silicone. The grease absorbent media may be fireproof. The device may also include a fire suppression element having a heat releasable package including a fire suppressing media, the heat releasable package located above and surrounding the interior receptacle. The outer housing of the device may include an integrated hanging structure. The integrated structure includes a pair of opposing tabs projecting from the outer housing.

A universal mounting bracket may also be provided, with one of the mounting bracket and the outer housing including an opening and the other of the mounting bracket and the outer housing including a projection receivable into the opening to hang the outer housing on the universal mounting bracket without using tools. The universal mounting bracket may be configured to accept and hang the outer housing in a selected one of a plurality of different locations relative to the mounting bracket. The universal mounting bracket may include at least one arm having a series of spaced apart slots respectively defining one of the plurality of locations to hang the outer housing. The universal mounting bracket may be U-shaped and include a pair of parallel arms each having a series of spaced apart slots respectively defining one of the plurality of locations to hang the outer housing. Alternatively, the universal mounting bracket may include a pair of L-shaped arms extending in a spaced apart relationship from one another, each of the pair of L-shaped arms having a series of spaced apart slots respectively defining one of the plurality of locations to hang the outer housing.

A grease containment shield surrounding the fan may also be provided. The grease containment shield may include a first edge and a second edge opposing the first edge, the first edge including a grease containment lip, and the second edge including a grease drip spout above the inlet.

An embodiment of a grease containment kit for an exhaust fan has also been disclosed. The kit includes: at least one replaceable grease containment device including: an outer housing defining an interior receptacle, a first end surface, and a second end surface opposing the first end surface, wherein the first end surface includes an inlet to the interior receptacle for grease from the exhaust fan, and wherein the second end surface includes a crowned drainage surface leading to at least one drainage opening; and an inner housing in the interior receptacle, the inner housing including a quantity of grease absorbent media in communication with the inlet, wherein the grease absorbent media is hydrophobic, and the wherein the inner housing includes a porous portion proximate the sloped drainage surface; and at least one universal mounting bracket configured to hang the outer housing at a selected one of a plurality of locations relative an exhaust fan.

Optionally, the at least one universal mounting bracket is one of a roof-mount universal mounting bracket or a wall-mount universal mounting bracket. At least one grease containment shield may be provided that includes a grease containment lip and a grease drip spout.

An embodiment of a grease containment assembly for a rooftop or wall-mounted exhaust fan has also been disclosed. The assembly includes a replaceable grease containment device including: an outer housing defining an interior receptacle, a first end surface, and a second end surface opposing the first end surface, wherein the first end surface includes an inlet to the interior receptacle for grease from the exhaust fan and a second end surface including a crowned drainage surface leading to at least one drainage opening; and an inner housing in the interior receptacle, the inner housing including a quantity of grease absorbent media in communication with the inlet, wherein the grease absorbent media is hydrophobic, and the wherein the inner housing includes a porous portion proximate the sloped drainage surface; and a universal mounting bracket holding the outer housing in a selected one of a plurality of locations relative to the roof-mounted or wall-mounted exhaust fan.

The assembly may also include at least one grease containment shield surrounding the exhaust fan, wherein the at least one grease containment shield includes a grease containment lip and a grease drip spout proximate the inlet.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A grease containment device for an exhaust fan, the device comprising:
   an outer housing defining an interior receptacle, a first end surface, and a second end surface opposing the first end surface, wherein the first end surface includes an inlet to the interior receptacle for grease from the exhaust fan, and wherein the second end surface includes a sloped drainage surface leading to at least one drainage opening; and
   an inner housing in the interior receptacle, the inner housing including a quantity of grease absorbent media in communication with the inlet, wherein the grease absorbent media is hydrophobic, and the wherein the inner housing includes a porous portion proximate the sloped drainage surface.

2. The grease containment device of claim 1, further comprising a fire retardant material surrounding the inner housing in the interior receptacle.

3. The grease containment device of claim 1, wherein the grease absorbent media is a particulate material.

4. The grease containment device of claim 3, wherein the grease absorbent media includes expanded perlite particles treated with a silicone.

5. The grease containment device of claim 1, wherein the device further comprises a fire suppression element comprising a heat releasable package including a fire suppressing media, the heat releasable package located above and surrounding the interior receptacle.

6. The grease containment device of claim 1, wherein the grease absorbent media is fireproof.

7. The grease containment device of claim 1, wherein the outer housing includes an integrated hanging structure.

8. The grease containment device of claim 7, wherein the integrated hanging structure includes a pair of opposing tabs projecting from the outer housing.

9. The grease containment device of claim 1, in combination with a universal mounting bracket, one of the universal mounting bracket and the outer housing including an opening and the other of the universal mounting bracket and the outer housing including a projection receivable into the opening to hang the outer housing on the universal mounting bracket without using a tool.

10. The grease containment device of claim 9, wherein the universal mounting bracket is configured to accept and hang the outer housing in a selected one of a plurality of different locations relative to the universal mounting bracket.

11. The grease containment device of claim 10, wherein the universal mounting bracket includes at least one arm having a series of spaced apart slots respectively defining one of the plurality of different locations to hang the outer housing.

12. The grease containment device of claim 11, wherein the universal mounting bracket is U-shaped and includes a pair of parallel arms each having a series of spaced apart slots respectively defining one of the plurality of different locations to hang the outer housing.

13. The grease containment device of claim 11, wherein the universal mounting bracket includes a pair of L-shaped arms extending in a spaced apart relationship from one another, each of the pair of L-shaped arms having a series of spaced apart slots respectively defining one of the plurality of different locations to hang the outer housing.

14. The grease containment device of claim 9, in combination with a grease containment shield surrounding the exhaust fan.

15. The grease containment device of claim 14, wherein the grease containment shield includes a first edge and a second edge opposing the first edge, the first edge including a grease containment lip, and the second edge including a grease drip spout above the inlet.

16. A grease containment kit for an exhaust fan, the kit comprising:

at least one replaceable grease containment device comprising:
an outer housing defining an interior receptacle, a first end surface, and a second end surface opposing the first end surface, wherein the first end surface includes an inlet to the interior receptacle for grease from the exhaust fan, and wherein the second end surface includes a crowned drainage surface leading to at least one drainage opening; and
an inner housing in the interior receptacle, the inner housing including a quantity of grease absorbent media in communication with the inlet, wherein the grease absorbent media is hydrophobic, and the wherein the inner housing includes a porous portion proximate the crowned drainage surface; and
at least one universal mounting bracket configured to hang the outer housing at a selected one of a plurality of locations relative to the exhaust fan.

17. The grease containment device kit of claim 16, wherein the at least one universal mounting bracket is one of a roof-mount universal mounting bracket or a wall-mount universal mounting bracket.

18. The grease containment device kit of claim 16, further comprising at least one grease containment shield including a grease containment lip and a grease drip spout.

19. A grease containment assembly for a rooftop or wall-mounted exhaust fan, the assembly comprising:
a replaceable grease containment device comprising:
an outer housing defining an interior receptacle, a first end surface, and a second end surface opposing the first end surface, wherein the first end surface includes an inlet to the interior receptacle for grease from the exhaust fan and a second end surface including a crowned drainage surface leading to at least one drainage opening; and
an inner housing in the interior receptacle, the inner housing including a quantity of grease absorbent media in communication with the inlet, wherein the grease absorbent media is hydrophobic, and the wherein the inner housing includes a porous portion proximate the crowned drainage surface; and
a universal mounting bracket holding the outer housing in a selected one of a plurality of locations relative to the rooftop or wall-mounted exhaust fan.

20. The grease containment assembly of claim 19, further comprising at least one grease containment shield surrounding the rooftop ot wall-mounted exhaust fan, wherein the at least one grease containment shield includes a grease containment lip and a grease drip spout proximate the inlet.

* * * * *